United States Patent [19]
Jeppson

[11] 3,961,568
[45] June 8, 1976

[54] APPARATUS FOR THE PREPARATION OF PRE-COOKED MEAT PRODUCTS

[76] Inventor: Morris R. Jeppson, Box 4943, Carmel, Calif. 93921

[22] Filed: Feb. 14, 1974

[21] Appl. No.: 442,412

Related U.S. Application Data

[60] Division of Ser. No. 262,636, June 14, 1972, abandoned, which is a continuation-in-part of Ser. No. 106,641, Jan. 15, 1971, abandoned.

[52] U.S. Cl. .............................. 99/339; 99/443 C; 219/10.55 A
[51] Int. Cl.² ................. A47J 37/00; H05B 9/06
[58] Field of Search ............ 99/339, 340, 349, 355, 99/386, 390–391, 400, 427, 443 C, 446; 34/1; 126/101, 348, 362, 369; 237/16; 426/241, 244; 219/10.55 A

[56] References Cited
UNITED STATES PATENTS

| | | | |
|---|---|---|---|
| 1,140,239 | 5/1915 | Barth | 126/101 |
| 2,529,253 | 11/1950 | Hoffman et al. | 99/339 X |
| 2,556,671 | 6/1951 | Auslander | 126/101 |
| 2,741,978 | 4/1956 | Cheftel et al. | 99/339 X |
| 3,409,447 | 11/1968 | Jeppson | 426/244 |
| 3,427,171 | 2/1969 | Jeppson | 99/443 C X |
| 3,437,495 | 4/1969 | Jeppson | 426/241 |
| 3,578,463 | 5/1971 | Smith et al. | 426/241 |
| 3,646,878 | 3/1972 | Keller | 99/443 C X |
| 3,674,504 | 7/1972 | Lane | 99/443 C X |
| 3,677,171 | 7/1972 | LeVan | 99/446 X |

Primary Examiner—Peter Feldman
Assistant Examiner—Arthur O. Henderson
Attorney, Agent, or Firm—Phillips, Moore, Weissenberger Lempio & Strabala

[57] ABSTRACT

Bacon or other meat food is prepared for distribution and storage in a pre-cooked heat and serve form by a sequence of distinct steps in which microwave heating is preceded by a steam heating step and may be followed by a finish hot gas treatment to control final moisture content, on a conveyorized continuous process basis. Preferably the pre-microwave treatment is accomplished in two stages consisting of a steam stage followed by a hot air stage. The amount of costly microwave heating and the length of microwave tunnel required is reduced by the preliminary steam treatment which economically accomplishes a partial cooking including rendering of fat and partial dehydration. Hot air treatment preceding or accompanying the mirowave heating removes surface moisture which would otherwise absorb microwave energy. Steam flow during the preliminary treatment is preferably opposite to the direction of movement of the product which then encounters progressively hotter and drier steam to optimize the preheating and initial rendering of fat. The process may be followed by aseptic or hot-fill canning or by a chilling step prior to packaging for storage under refrigeration. Rendered fat may be recovered from each heating stage of the process with the fat from the steam stage preferably being passed through the subsequent hot air treatment region to provide a desirably dry fat.

7 Claims, 8 Drawing Figures

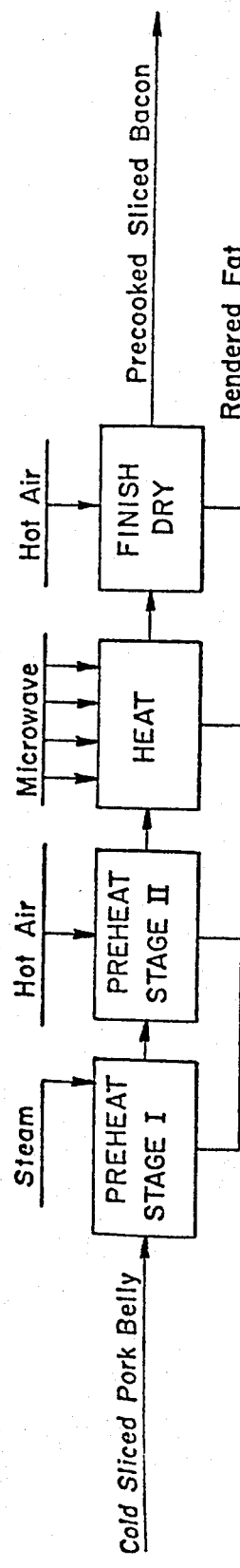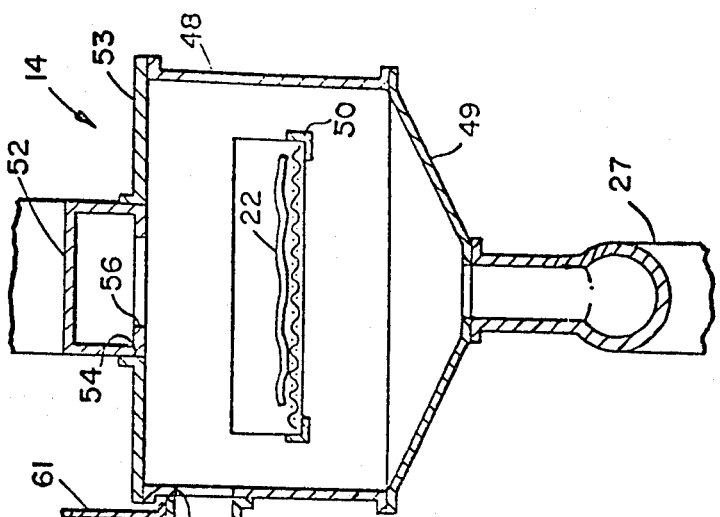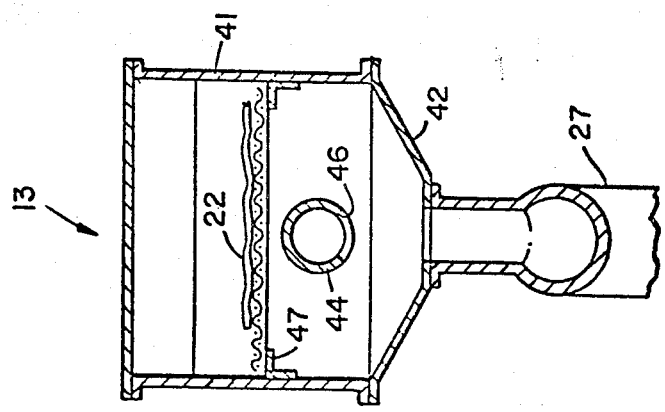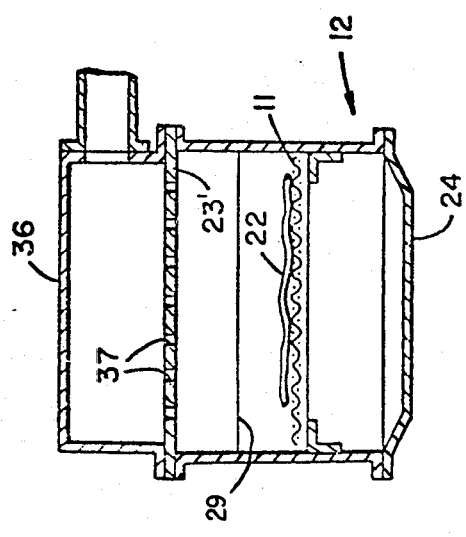

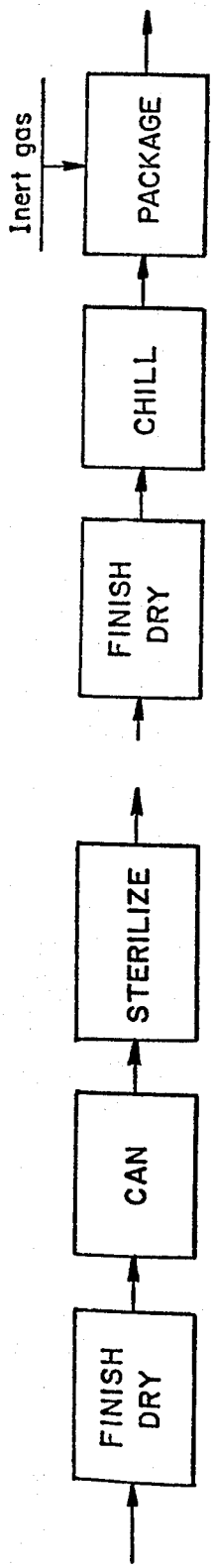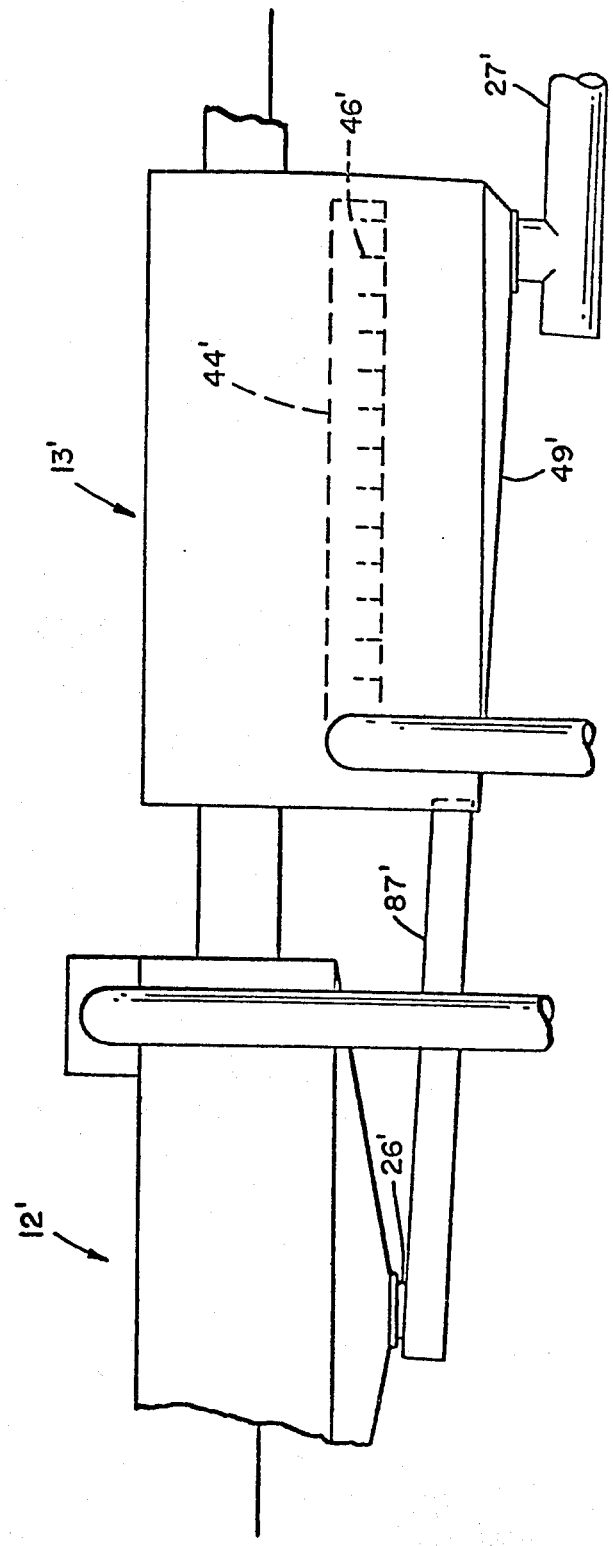

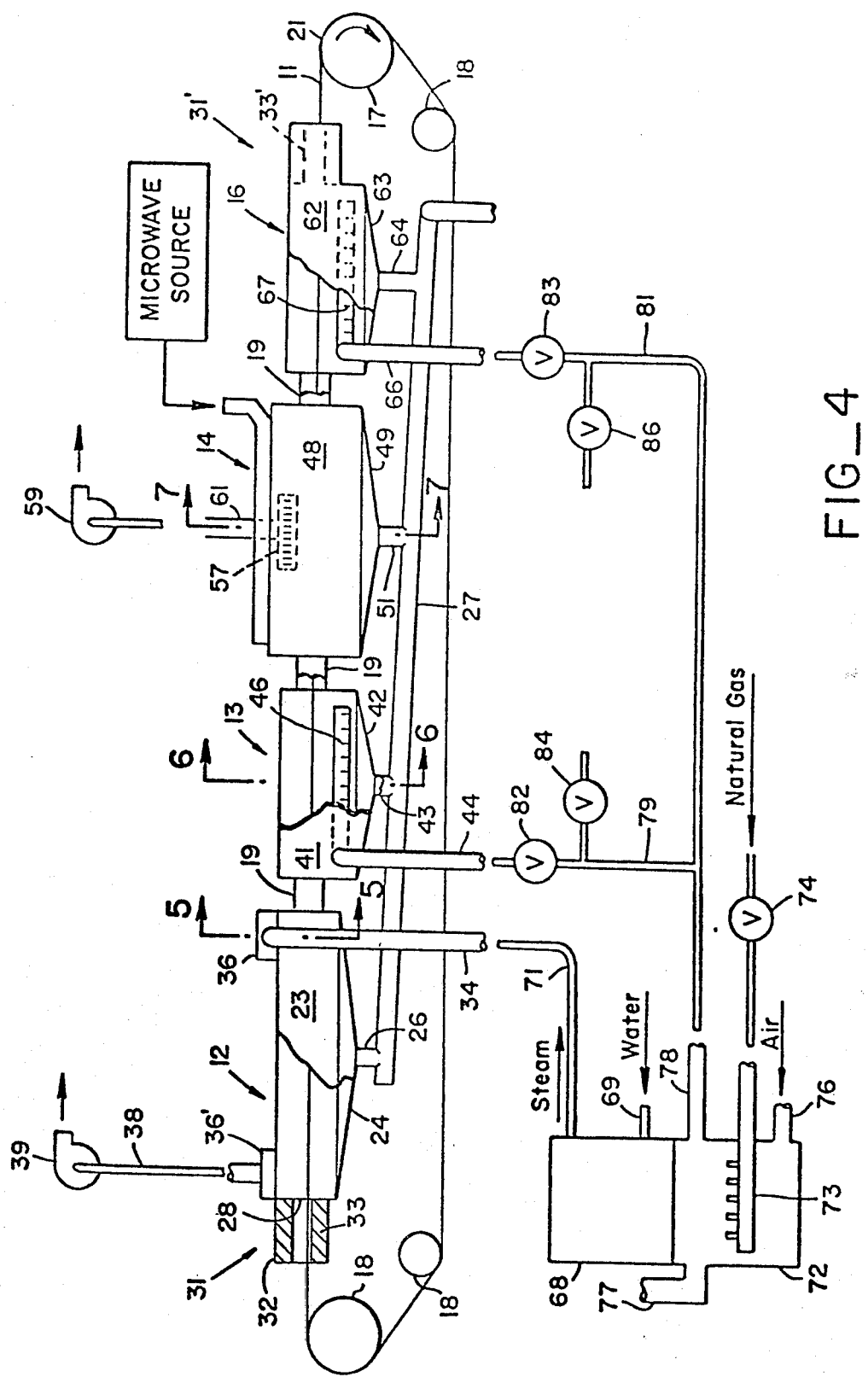
FIG_4

3,961,568

APPARATUS FOR THE PREPARATION OF PRE-COOKED MEAT PRODUCTS

CROSS REFERENCE TO RELATED APPLICATION

This application is a division of prior copending application Ser. No. 262,636 filed June 14, 1972 and now abandoned, said application Ser. No. 262,636 having been a continuation-in-part of copending application Ser. No. 106,641 of Morris R. Jeppson, filed Jan. 15, 1971 and entitled "Method and Apparatus for the Preparation of Pre-Cooked Meat Products", also now abandoned. The method disclosed in the present application is the subject matter of a copending application Ser. No. 445,086, of Morris R. Jeppson, filed Feb. 25, 1974 and issued Sept. 16, 1975 as U.S. Pat. No. 3,906,115.

BACKGROUND OF THE INVENTION

This invention relates to the preparation of pre-cooked food products and more particularly to a process and apparatus for preparing pre-cooked meat products which may be stored and subsequently may be quickly heated prior to serving.

In the commercial processing of foods for distribution to consumers, considerable emphasis is currently being directed to reducing the time and effort needed to prepare the food for serving. While some foods are naturally adapted to serving with a minimum of time and effort, others have characteristics which seemingly require prolonged cooking and which are incompatible with pre-cooking by conventional techniques. Bacon and other fatty meats, such as sausage and spareribs, are examples of foods which long resisted attempts to develop a practical commercial pre-cooking process.

The cooking of bacon, for example, is a process in which fat is rendered, water is evaporated and protein is cooked and this has required an inconvenient amount of time if performed just prior to consumption. It has been difficult to develop a practical technique for pre-cooking bacon inasmuch as the product, if prepared by conventional methods, is either expensive to produce, too oily, low in saleable yield or difficult to control in uniformity of cook. Bacon produced in a continuous oil fryer is oil soaked and tends to be twisted up. Bacon produced in a continuous infra-red oven cooks unevenly with a high rejection rate and causes equipment contamination problems.

Many other meat products have not been readily susceptible to pre-cooking by conventional techniques prior to distribution. Jerky-like products, for example, need little or no preparation immediately prior to consumption, but have conventionally required very extensive or prolonged pre-treatment.

The recent development of microwave heating in the presence of a hot air flow has provided a highly significant advance in the art of pre-cooking meat products. The unique nature of microwave heating, in which the product is heated uniformly throughout rather than being cooked progressively from the exterior surfaces inward, not only greatly shortens cooking time but in many cases also imparts desirable properties to the finished product. U.S. Pat. No. 3,321,314, for example, discloses a process for pre-cooking bacon with microwave energy accompanied by a hot air flow which not only reduces cooking time but also provides good end point control so the bacon is neither overcooked and brittle or undercooked and greasy. Bulk handling and distribution is practical. Microwave heating in the presence of hot air has also been applied to many other meat products with equally beneficial results.

An important consideration in adapting microwave heating to food processing, and particularly to the treatment of foods which require a sizeable heat input, is that of minimizing the microwave input required to accomplish the desired result. Microwave is a relatively costly heating technique. The magnetron tubes or the like used for generating microwave frequencies, and the necessary waveguides and other auxiliary equipment, are costly items. Electrical power consumption is high relative to the actual heat input to the product as a sizeable portion of the energy is ultimately dissipated by heating components of the processing apparatus rather than the product itself. Where the products are handled on a high volume basis, the physical size of a conveyorized microwave tunnel may also create problems.

Microwave energy does not couple strongly to cold fats but strongly heats moisture present in or on a product. Microwave also tends to cause moisture migration to the surface of the product and the resulting evaporation maintains the surface region somewhat cooler than the interior. For these and other reasons, optimum results in a microwave heating process often depend on a careful adjustment of process conditions to the characteristics of the particular product at various stages in the course of treatment.

SUMMARY OF THE INVENTION

This invention is a process and apparatus for economically pre-cooking meat products while providing for flexibility in the control of process conditions. In particular, microwave heating of the product is preceded by a steam heating step. The preheating with steam economically achieves a partial cooking including partial rendering of fat and removal of water. As a consequence, the amount of microwave power required in the subsequent cooking step is reduced and a relatively short microwave tunnel may be utilized if desired.

The preliminary steam heating step is followed by exposure to hot air or the like to remove surface moisture, which would absorb microwave, and to accomplish further cooking particularly at the product surface. While this hot air exposure may be concurrent with the microwave heating step it is advantageous under some conditions if exposure to hot air precedes microwave heating to some extent. Thus the preliminary heating may be performed in two stages in which the product is first preheated by exposure to steam and then further preheated by exposure to hot air or the like. Both preheating stages including the steam stage reduce the internal moisture content in addition to cooking and rendering fat although the steam treatment may cause accumulation of moisture at the product surface. This is removed by the hot air flow.

Depending on the characteristics of the uncooked meat and on the final properties which are required, it may be desirable to follow the microwave heating step with a finish dry step involving a further exposure to hot air. A hot air treatment following microwave heating provides excellent control of the final moisture content of the product and is, in effect, a preliminary cooling step in those instances where the product is to be chilled for packaging. In other instances, the heating steps are followed by asceptic of hot-fill canning.

Although other techniques may be used, it is advantageous if the steam preheating step is accomplished by passing the product through a tunnel in which hot dry steam is injected near the product exit end of the tunnel, the steam being withdrawn from the entrance end. As a consequence, the initially cold product encounters steam which is progressively hotter and dryer thereby realizing cost economies with respect to steam usage as well as in the subsequent microwave heating.

If pronounced flavor is desired in the case of products such as bacon which are cured, pickled or otherwise treated prior to pre-cooking for the purpose of imparting desired flavor characteristics, the concentration of the curing solution may be increased to counteract any tendency of the steam to leach out flavor.

Also in a preferred form of practice of the invention, rendered fat is recovered from the several heating stages. If a very dry high quality fat product is required, it is advantageous to pass the fat recovered from the steam stage through the subsequent hot air stage.

Accordingly, it is an object of this invention to provide a more economical process for preparing pre-cooked meat products in which microwave energy is employed.

It is a further object of this invention to provide for greater control of process variables and product characteristics in the processing of meat products with microwave energy.

The invention, together with further objects and advantages thereof, will best be understood by reference to the following description of preferred embodiments in conjunction with the accompanying drawings.

BRIEF DESCRIPTION OF THE DRAWINGS

In the accompanying drawings:

FIG. 1 is a block diagram illustrating one suitable sequence of steps in the practice of the process as applied to the preparation of pre-cooked bacon under conditions where the most optimized control of product characteristics are desired.

FIGS. 2 and 3 are block diagrams illustrating alternate preservative steps which may follow the steps depicted in FIG. 1, FIG. 4 illustrates apparatus suitable for performing the method on a continuous process basis with portions of the apparatus being broken out and with other portions of the apparatus being shown in schematic form, FIG. 5 is a cross section view taken along line 5—5 of FIG. 4 illustrating the internal construction of a steam heating tunnel suitable for use in the process, FIG. 6 is a cross section view taken along line 6—6 of FIG. 4 illustrating suitable internal construction for a hot air heating tunnel utilized in the method, FIG. 7 is a cross section view taken along line 7—7 in FIG. 4 illustrating one suitable construction for a microwave heating tunnel also employed in the practice of the method, and FIG. 8 illustrates a modification of the steam heating tunnel and adjacent hot air tunnel.

DESCRIPTION OF THE PREFERRED EMBODIMENTS

As a technique for cooking food products, microwave heating has the pronounced advantage of being extremely rapid. This results largely from the ability of microwave energy to penetrate and generate heat throughout the interior regions of the product. Older heating methods rely on the slow conduction of heat from the exterior surfaces inward.

Owing to the basically different distribution of heat within a food heated by microwave, the product may exhibit texture, flavor and surface coloration characteristics which differ from those of a food cooked by more conventional techniques. As these differing characteristics may not be fully acceptable to the consumer, it has heretofore been the practice to supplement the microwave heating with a simultaneous treatment with hot air or the like. The supplementary heating acts primarily on the surface of the product and imparts desired characteristics so that in many cases the final product is virtually indistinguishable from one prepared by more conventional cooking methods.

Equipment costs, dissipated power and other factors make microwave heating a relatively expensive cooking technique. This is particularly true in connection with foods which require extended cooking, such as meat and especially fatty meats. The cooking of sliced bacon for example is a process in which a large quantity of fat must be rendered and considerable water must be evaporated in addition to the cooking of the lean meat. This requires a very substantial thermal energy input.

Accordingly, substantial advantages can be realized by reducing the overall cost of cooking processes which involve microwave energy. Microwave heating may then be more satisfactorily applied to large scale industrial pre-cooking of meat products particularly in the case of certain fatty meat products, such as bacon, sausage and the like, which cannot be readily distributed on a pre-cooked basis except by utilizing microwave techniques.

The present invention realizes substantial economies in the pre-cooking of meat products by preheating the product with steam prior to microwave heating, and by subjecting the product to a relatively dry hot gas treatment following the steam heating. Contrary to what might be expected, I have discovered that a preliminary steam treatment accomplishes substantial moisture removal in addition to rendering fat and cooking protein. The steam stage not only reduces the amount of expensive microwave heating which is required but also provides for more efficient utilization of such microwave energy as is required. Greater efficiency of the microwave heating results since microwave energy couples much more strongly to hot fat than to cold fat. The sequentially staged heating and drying by a combination of techniques has the further advantage of providing for more precise control over various characteristics of the product.

Considering now the steps which may be employed, wholly or in part, to accomplish the above discussed results, with reference to FIG. 1 of the drawings, the process will be initially described with reference to the pre-cooking of bacon for storage and distribution on a commercial scale. Other related meat products which may also be advantageously processed by this technique will hereinafter be discussed.

The slicing of bacon must be performed on cold pork bellies as heating lessens cohesion, particularly within the fatty portions. The slices of cured cold pork belly are initially given a first stage preheating treatment by exposure to steam in the temperature range of about 212°F to about 350°F. The term "about 212°F" as herein used refers to minimum temperature steam and is intended to include temperatures which can be somewhat below this figure due to the presence of water droplets mixed with the vapor phase, altitude effects and the like. While any significant amount of steam exposure accomplishes some desirable result, optimized results are generally obtained by exposing the bacon to the steam for a time period in the range of about 30 seconds to about 180 seconds.

Preheating with steam during this step heats the slices to a temperature at which microwave energy will more strongly couple to the product and also accomplishes a partial cooking in a relatively economical manner, particularly at and near the surfaces of the slices. The steam step has also been found to accomplish rendering of a substantial portion of the fat content of the meat, rendering of as much as 40% of the fat content being effected under some conditions. Approximately one third of the water content of the cold meat may be removed by the steam preheating step.

In some instances, the steam preheating may tend to produce a slight leaching of flavor elements from the bacon. It has been found that this may be counteracted, where necessary, by increasing the concentration of the curing solution in which the pork bellies are treated prior to pre-cooking.

While the steam step may be directly followed by microwave irradiation in the presence of a hot substantially non-aqueous gas, a further significant reduction in the required amount of microwave heating, can be realized by subjecting the product to a second preheating step using a non-aqueous hot gas. Subsequent to the steam preheating step, the slices undergo a first exposure to hot air or other relatively dry gas preferably within the temperature range of from about 150°F to about 400°F with an exposure time which may typically range up to about 200 seconds. This removes moisture in and near the surface of the slices, including some of the inherent moisture of the meat as well as surface moisture which may have been contributed by the steam preheating stage. Accordingly, following the first and second preheating stages, the slices are hot and partially cooked and a portion of the original moisture of the meat has been removed.

The slices are next subjected to a microwave irradiation for a period sufficient to complete or substantially complete the cooking and rendering of fat. In some instances, a slight degree of undercooking may be desirable since the microwave step may be followed by a finish drying step as will hereinafter be described and since the product may ultimately be briefly reheated just prior to consumption. Microwave irradiation time may be highly variable since there are significant differences between individual batches of raw material. In the case of bacon slices, cooking time is affected by the thickness and length of the slices and by other factors such as the ratio of lean meat to fat. There may also be differences in the desired properties of the end product with regard to crispness and the like. Available microwave power input relative to the quantity of product in the microwave heating region also affects processing time. Under most conditions, the optimum microwave irradiation period is from about 50 seconds to about 200 seconds.

It is important at this stage that liquid fat be continuously removed as it is rendered. If rendered fat is retained about the slices, as usually occurs in conventional frying, the fat dissipates microwave energy and causes the brittleness which was long an obstacle to successful pre-cooking of bacon. A body of hot liquid fat around the slices results in the overcooking of the fatty portions of the slices and such overcooking is an important cause of brittleness. Microwave energy couples to the lean meat or muscle more strongly than to the fat and thus if rendered fat is continuously removed, the lean portions of the slices may be fully cooked without overcooking the fat portions.

The above described microwave heating step is accompanied by the evolution of moisture as well as fat at the surface of the slices, with the result that at the completion of the microwave heating step, the surface regions may be undesirably moist. Moreover, the presence of evaporating water at the surface during microwave heating has a cooling effect which tends to reduce cooking at the surface relative to cooking within the interior of the slices. In many cases these effects may be adequately counteracted by maintaining a flow of hot air or the like within the microwave heating region. In instances where this is not satisfactory or more precise control of end product quality is desired, the microwave heating step is followed by a final finish dry hot air exposure to control the final moisture content of the product and to crispen the surface. Air temperature may range from about 100°F to 300°F with exposure times up to about 200 seconds, depending on the characteristics of the product. The finish drying step is independent of the microwave heating stage which may thus be controlled with a view to optimizing cooking rather than moisture content as such.

The product of the above described sequence of steps is a precooked sliced bacon having taste characteristics comparable with conventionally fried bacon and having improved mechanical properties whereby the bacon strips may be more satisfactorily packaged or canned for storage and distribution. Rendered fat from each of the above described stages may also be recovered and utilized for the conventional purposes. The hot sterile pre-cooked bacon slices may be passed directly from the finish drying step to a suitable asceptic or hot-fill canning system as illustrated in FIG. 2 or alternately may be subjected to a chilling step with cold gas or the like and may then be packaged for storage under refrigeration as illustrated in FIG. 3. Where asceptic or hot-fill canning is not employed, it is preferable that the product be packaged in an atmosphere of inert gas such as nitrogen or carbon dioxide, the term "inert" being herein employed to refer to gases which inhibit deterioration of the product.

Where the product is chilled prior to packaging, a finish drying step as described above achieves still further process economies. Although the finish drying is basically a heat treatment, it may also be, in effect, a precooling step between the microwave heating and chilling operations since the elevated air temperature employed in the finish drying is usually lower than the temperature of the product as it emerges from the microwave heating step.

While the method has been described as applied to the precooking of bacon in particular, the same steps may be advantageously used to process various other meat products, examples of which are sausage in either patty or link form, jerky-like snack foods prepared from strips of beef, turkey, ham or fish, as well as simulated jerkies prepared from ground meats. Spareribs may be processed in an essentially similar manner and the method provides a very economical means for recovering salvage fats from butchering operations. Processing of comminuted fat chunks in accordance with the above described process produces desirably dry fats notwithstanding the use of low cost steam to provide a sizeable portion of the heat input. Salvaging fats from butchering operations is recognized as a serious environmental pollution problem in that conventional methods produce sizeable quantities of fat contaminated water. This does not occur in the method described. There is very little release of contaminants in the exhausts of steam and hot air.

The method is most efficiently practiced on a continuous process basis and FIG. 4 illustrates a suitable conveyorized system for this purpose wherein process economies are further optimized by utilizing a single heat source for both steam and hot air.

Where all of the above described steps are to be utilized, conveyor belt 11 is arranged to travel sequentially through four distinct processing tunnels including a steam tunnel 12, first hot air tunnel 13, microwave tunnel 14 and a second hot air tunnel 16. Conveyor belt 11 is supported by a suitable drive pully 17 and idler pullys 18 in a position whereby a flat horizontal upper portion of the belt extends through each of the tunnels 12 to 16 and through relatively constricted transition tunnels 19 situated therebetween, the drive pully 17 being turned in the direction indicated by arrow 21 to cause each area of the belt to move sequentially through tunnels 12 to 16. As best seen by reference to FIGS. 5, 6, or 7 in conjunction with FIG. 4, the conveyor belt 11 is of a form which allows rendered fat to be immediately drained away from the product 22, such as bacon slices, carried on the belt. In this example, this is achieved by forming the belt 11 of porous mesh or screen material. Inasmuch as the belt must pass through a microwave heating region in immediate contact with the product to be heated, the belt is formed of an electrically nonconductive material such as glass fiber to avoid interference with the desired microwave heating effect. The continuous removal of rendered fat may also be accomplished in other ways. A solid belt may be used, for example, if it is slightly inclined towards one side of the path of travel.

Referring now to FIGS. 4 and 5 in conjunction, the steam tunnel 12 has an essentially rectangular housing 23 with a floor portion 24 substantially all areas of which are inclined slightly to drain rendered fat to a centrally located outlet 26 which connects with an inclined drain conduit 27 extending beneath all of the tunnels 12 to 16. Conveyor belt 11 enters steam tunnel 12 through a restricted opening 28 at the input end and leaves through a restricted opening 29 which communicates with the adjacent transition section 19, the level of the belt in the steam tunnel being substantially intermediate between the upper and lower portions of the tunnel.

Under some conditions, it may be desirable that the restricted input opening 28 be extended by an elongated housing 31 having an outer shell 32 formed of electrically conductive material and having a thick lining 33 therein formed of microwave absorbent material such as various electrically lossy ceramics or water containing elements. The absorbent lining 33 attenuates any microwave energy which propagates into input opening 28 from the microwave tunnel 14 without being absorbed in passage therebetween or otherwise blocked. In systems where size of the product undergoing treatment is substantially smaller than the wave length of the microwave energy injected into the tunnel 14, absorber material 33 may not be needed as the dimensions of the various transition sections 19 and openings such as 28 and the ends of the several tunnels may have sufficiently small dimensions to function as cutoff waveguides and thereby block any significant release of microwave energy.

Means for introducing steam into tunnel 12 includes a steam conduit 34 communicating with a steam inlet manifold housing 36 situated on the top surface of steam tunnel housing 23 at the product exit end thereof near exit openings 29. As best shown in FIG. 5 in particular, the top member 23' of steam tunnel housing 23 has a series of small passages 37 under a manifold 36 to pass steam into the product region of the steam tunnel. A portion of the injected steam passes through belt 11 so that the product 22 is subjected to steam at substantially all exterior surfaces thereof.

Referring again to FIG. 4 in particular, a steam exhaust manifold 36' which may be essentially similar to the inlet manifold 36 is situated at the top of steam tunnel housing 23 near the product input end thereof. A steam exhaust conduit 38 connects outlet 36' with a pump 39 which withdraws the steam from the input end of steam tunnel 23. This arrangement of inlet manifold 36 at the product output end of the steam tunnel 23 with the exhaust manifold 36' being at the input end and being provided with an exhaust pump 39 may be utilized to optimize the process by creating a steam flow in a direction opposed to the movement of the product itself. Steam tends to be cooled and become wetter by interaction with the product and the practical result of the reversed steam flow is that the product is exposed to progressively hotter and drier steam as it becomes hotter itself.

Referring now to FIGS. 4 and 6 in conjunction, the first stage hot air tunnel 13 may also be defined by an essentially rectangular housing 41 having a floor 42 which slopes towards a central drain 43 communicated with the drain conduit 27. The admission of hot air to tunnel 13 may be through a conduit 44 which enters one side of the housing near the input end thereof and which extends longitudinally within the tunnel below the conveyor belt 11. Within tunnel 13 conduit 44 has a series of air emission slots 46 which are preferably on the underside of the conduit so that any liquid fats which may attempt to enter the slots are more readily expelled by the air flow therethrough. Hot air emitted through slots 46, more or less uniformly along the length of tunnel 13, is transmitted upwardly through conveyor belt 11 which rests upon guides 47 extending along the inner side walls of housing 41 to surround the product 22 on the belt. In this example of the invention, air from the first stage tunnel 13 is exhausted through the subsequent microwave tunnel 14 and intervening transition section 19.

As best shown in FIGS. 4 and 7 in conjunction, the microwave heating tunnel 14 may be of known construction except insofar as the process of the present invention requires less microwave heating and therefore the tunnel 14 may, if desired, be of shorter length than the tunnels heretofore employed for pre-cooking similar meat products. Alternately, a tunnel of conventional length may be used with the conveyor means being speeded accordingly. Thus microwave tunnel 14 may have an essentially rectangular housing 48 formed of electrically conductive material with a bottom member 49 sloped to converge to a centrally located drain 51 communicating with drain conduit 27. As best seen in FIG. 7, in particular, housing 48 should have a width, transverse to the direction of travel of conveyor belt 11, which is greater than the width of the product on the conveyor belt, inasmuch as the heating effect of microwave energy is minimal in the immediate vicinity of an electrically conducting wall. Suitable guides 50 may extend longitudinally within tunnel 14 to support the edges of the conveyor belt 11, the guides being formed of an electrically non-conductive material to avoid interference with the microwave field.

Microwave energy is preferably injected into the tunnel 14 at points spaced along the length thereof and for this purpose, an injection waveguide 52 may be disposed along the center of the top member 53 of housing 48 with the lower surface of the waveguide being fitted into a matching slot 54 extending along the top member so that the waveguide in effect defines a portion of the top wall of the tunnel. A series of transverse slots 56 are provided in the wall of waveguide 52 which faces conveyor belt 11 to provide for a distributed injection of microwave energy into the tunnel in accordance with techniques understood within the art. Microwave energy injected substantially downwardly through waveguide slots 56 is repeatedly reflected between opposing walls of the housing 48 and thus repeatedly passes through the product 22 on conveyor belt 11, causing the generation of heat therein largely by interaction with the moisture content of the product. As heat is generated throughout the volume of product 22 cooking is very rapid and there is a tendency for the constituent moisture of the product to be driven toward the surface thereof.

To withdraw cooking gases evolved from the product 22 and to exhaust air from the adjacent hot air heating tunnels 13 and 16 through the intervening transition sections 19, an exhaust manifold 57 is secured to one sidewall of the housing 48 preferably at a central position along the tunnel and near the top thereof. A series of spaced openings 58 in the sidewall of tunnel 14 communicates the exhaust manifold 57 with the interior region of the tunnel, the openings 58 having sufficiently small dimensions in relation to the wave length of the microwave energy to prevent leakage of such energy. As shown in FIG. 4, in particular, an air exhaust pump 59 communicates with manifold 57 through an exhaust conduit 61.

The final hot air tunnel 16 may be a structure essentially similar to the previously described first stage hot air tunnel 13 and thus has a rectangular housing 62 with inclined floor member 63 converging to a drain 64 which communicates with drain conduit 27 and has a hot air supply conduit 66 transpierced through a sidewall and extending longitudinally within the tunnel 16 below conveyor belt 11, the supply conduit having air emission slots 67 distributed along the underside. As the final stage of this example of the apparatus, tunnel 16 may be provided with an output housing 31', containing microwave-absorbent material 33' in an arrangement similar to that previously described for housing 31 at the input end of the system.

In keeping with the objective of reducing processing costs, FIG. 4 illustrates means for generating the necessary steam and hot air flow from a single source. In particular, a boiler 68 having water inlet conduit 69 and steam outlet 71 includes a combustion chamber 72. A burner element 73 is situated within combustion chamber 72 and is supplied with a suitable fuel such as natural gas through a fuel supply control valve 74. To support combustion of the natural gas, inlet means 76 provides for an inflow of air to the combustion chamber and an exhaust stack 77 communicates with the region above the burner. Steam output conduit 71 is communicated with the previously described steam conduit 34 of tunnel 12 to provide the desired steam flow therethrough in conjunction with the exhaust pump 39.

Hot air for tunnels 13 and 16 is obtained from the upper region of combustion chamber 72 through a conduit 78 which extends into the combustion chamber above burner 73. Hot air conduit 78 has branches 79 and 81 which communicate with air input conduits 44 and 66 of tunnels 13 and 16, respectively, through individual control valves 82 and 83, respectively.

The natural gas supply valve 74 may be adjusted to determine the level of combustion in chamber 72. As valve 74 is adjusted basically with a view to controlling steam temperature in tunnel 12, the additional control valves 82 and 83 provide a means for independently and individually controlling hot air flow within the tunnels 13 and 16. Given a constant speed of operation of exhaust pump 59, valves 82 and 83 may be adjusted to control the rate of air flow through the tunnels 13 and 16, respectively, and to some extent this will affect air temperature therein. However, it is advantageous to be able to adjust air temperature in tunnels 13 and 16 independently of the rate of air flow and for this purpose supplementary control valves 84 and 86 are provided whereby cold air may be selectively admitted into hot air supply conduit branches 79 and 81, respectively. By selectively metering cold air into the flow to tunnels 13 and 16, any desired temperature may be achieved within a wide range limited at the upper end, by the temperature in the combustion chamber 72 above the burner 73.

As is evident from the structure described above, the term air as used herein with reference to the gas flow in the tunnels 13 and 16 should be understood to refer broadly to essentially non-aqueous gas which may not necessarily have the precise composition of atmospheric air. In this example of the invention, the air flows as obtained from the combustion chamber 72 include a substantial quantity of the combustion products of natural gas.

As discussed above, the process and apparatus of the present invention may be used for the salvaging of fats from butchering operations and in many instances useable fats are recovered as a by-product of the pre-cooking of certain meats such as bacon. The quality and storability of fats is dependent in part on moisture content and in the present instance the rendered fat drained from air tunnels 13 and 16 and microwave tunnel 14 is very dry and of extremely high quality. Fats drained from the steam tunnel 12, however, may have a relatively high moisture level. This moisture level may be reduced to an acceptable value in the process as heretofore described inasmuch as the fats from the steam tunnel are intermixed with the very dry fats from the subsequent processing stages. Should it be desired to maximize quality of the fat, the fat output of the steam tunnel may be separated from that of the subsequent processing stages. However, the present invention provides for an alternate technique for producing extremely high quality fat in which there is no loss from discarding the steam rendered fat. Modified portions of the apparatus for this purpose are illustrated in FIG. 8.

In particular, the apparatus may be similar to that hereinbefore described, except insofar as the interconnections between the steam tunnel 12' and first hot air tunnel 13' are modified so that fat drained from the steam tunnel is transferred into the first hot air tunnel to be dried prior to entering the drain conduit 27' which collects the rendered fat from the several processing stages. The steam tunnel 12' may be essentially similar to that previously described except insofar as the drain 26' does not communicate directly with drain conduit 27' but instead connects with an inclined closed through 87' leading to the input end of the adjacent hot air tunnel 13'. Hot air tunnel 13' may also be essentially similar to that previously described except that tunnel 13' may be deeper in order to receive the flow from trough 87'. To obtain the maximum exposure of the steam rendered fat to the dry, hot air emited from slots 46' of hot air conduit 44' within tunnel 13', the drain outlet of the floor member 49' is preferably located near the output end of the tunnel 13' so that fats from trough 87' must flow along substantially the entire length of the hot air tunnel.

It has been hereinbefore pointed out that either or both of the hot air stages of the process may not be necessary as distinct steps separate from the microwave irradiation, depending on characteristics of the raw product and desired properties of the finished product. However exposure to hot air or the like should be provided for at some stage following the steam step. Thus with regard to the above described apparatus, variations are possible in which one or both of the hot air tunnels 13 and 16 are omitted and in which a hot air flow is supplied directly to the microwave tunnel 14.

Considering now a specific example of the practice of the process, bacon slices, sliced sixteen slices per pound and having an initial weight of 400 grams and an initial length of about nine and three quarter inches, are exposed to steam at a temperature of 210°F for two minutes. The weight is then 260 grams and the temperature of the slices is 180°F. Ninety grams of rendered fat are recovered from the steam preheating step alone and about 50 grams of water are removed from the bacon. The bacon slices are then subjected to hot air at 300°F for 2 minutes after which the bacon has a weight of 230 grams and the bacon temperature is again 180°F. The bacon slices are then subjected to microwave irradiation for 2 minutes reducing the weight to 110 grams and raising bacon temperature to 220°F. Following subsequent exposure to hot air at 200°F for 2 minutes, the bacon weight is 105 grams and bacon temperature is again 180°F. Final length of the bacon slices is about 6 inches. Comparison with similar bacon slices broiled for 5 minutes as a control indicates no significant difference in color. The control slices have a slightly stronger flavor including some bitterness which is not apparent in the slices processed according to the invention. Texture is essentially the same except that the slices processed according to the invention are slightly less tough.

Considering now a specific example of the application of the process to the rendering and drying of fat, fat trimmings from beef and pork meat cutting operations, at a temperature in the range from 35°F to 45°F, are ground to the consistency of hamburger. A 1000 gram sample of the ground fat material is placed on a conveyer in a layer about one-half of an inch thick and is exposed to steam at 212°F for 4 minutes after which the weight has been reduced to 450 grams and the sample temperature is 185°F. The sample is then exposed to hot air at 300°F for 3 minutes after which weight has been reduced to 405 grams and sample temperature is 185°F. The sample is then exposed to microwave energy at 915MHz and a power intensity of about one kilowatt per square foot for two minutes after which the sample temperature has risen to 215°F and weight has been reduced to 140 grams. The sample is then passed into a hot air chamber, having an air temperature of 300°F. for 4 minutes after which weight has been reduced to 123 grams. The sample material is then golden colored, fairly crisp and is essentially all protein residue of the fat. The rendered fat recovered from each stage, other than the steam stage, is very dry with excellent storage life.

While the invention has been described with respect to certain preferred embodiments, it will be apparent that many variations are possible and it is not intended to limit the invention except as defined by the following claims.

What is claimed is:

1. Apparatus for pre-cooking fatty meat products comprising:

conveyor means for carrying said products along a predetermined path of travel, means forming a steam preheating housing around a first portion of said path of travel of said conveyor means for partially cooking said meat products and for partially dehydrating said products by exposure to steam through the rendering and removal of moisture containing fat from said products by said steam, means for maintaining the temperature in said steam preheating housing at a level at which fat is rendered from said product by supplying steam to said steam preheating housing means, electrically conductive means forming a microwave energy housing around at least a portion of the subsequent path of travel of said conveyor means, means for injecting microwave energy into said microwave housing to generate cooking heat within said products, additional heating means for maintaining a hot non-aqueous gas environment around at least a portion of said subsequent path of travel of said conveyor means to assure cooking of the surface regions of said product, and means for preventing accumulation of steam within said microwave housing.

2. Apparatus as defined in claim 1 wherein said additional heating means includes means forming a gas preheating housing between said steam preheating housing and said microwave housing, and means for supplying hot non-aqueous gas to said gas preheating housing.

3. Apparatus as defined in claim 1 wherein said conveyor is adapted for continuously eliminating rendered fats from the vicinity of said product within each of said steam preheating housing and said microwave housing and wherein each of said housings has drain means for salvaging said rendered fats therefrom.

4. Apparatus as defined in claim 1 further comprising:

means forming a finish heating housing around a still subsequent portion of said path of travel, and means for supplying hot non-aqueous gas to said finish heating housing including means for controlling the gas flow temperature therein independently of that provided by said additional heating means.

5. Apparatus for pre-cooking meat products comprising:
- conveyor means for carrying said products along a predetermined path of travel,
- means forming a steam preheating housing around a first portion of said path of travel,
- means for supplying steam to said steam preheating housing means,
- electrically conductive means forming a microwave energy housing around a subsequent portion of said path of travel,
- means for injecting microwave energy into said housing,
- means forming a hot non-aqueous gas enclosure around a portion of said path of travel which follows said first portion thereof,
- a steam boiler having water inlet means and having a fuel combustion chamber with an air inlet and fuel supply means,
- first conduit means communicating said boiler with said steam preheating housing,
- second conduit means communicating said combustion chamber with said gas enclosure, and
- means for drawing hot gas into said gas enclosure from said combustion chamber of said steam boiler.

6. Apparatus as defined in claim 1 wherein said steam preheating housing has a product entrance opening at one end and a product exit opening at the other end with said conveyor means being arranged to carry said product from said entrance opening to said exit opening, said steam preheating housing further having a steam exhaust opening and has a steam input opening which is situated further along said path of travel of said conveyor means than said exhaust opening with said steam exhaust opening being closest to said product entrance opening while said steam input opening is closest to said product exit opening, whereby a steam flow is established in a direction opposite to the movement of said conveyor means through said steam preheating housing.

7. Apparatus for pre-cooking meat products comprising:
- conveyor means for carrying said products along a predetermined path of travel,
- means forming a steam preheating housing around a first portion of said path of travel,
- means for supplying steam to said steam preheating housing means,
- electrically conductive means forming a microwave energy housing around a subsequent portion of said path of travel,
- means for injecting microwave energy into said microwave housing,
- means for maintaining a hot non-aqueous gas flow around a portion of said path of travel subsequent to said steam preheating housing,
- drain means for collecting rendered fat from said steam preheating housing, and
- conduit means extending from the lower region of said steam preheating housing into said hot non-aqueous gas flow means for transmitting said rendered fat from said steam preheating housing into said hot non-aqueouus gas flow means whereby steam rendered fat from said steam preheating housing is exposed to drying non-aqueous gas.

* * * * *